US009684681B2

United States Patent
Viehland et al.

(10) Patent No.: US 9,684,681 B2
(45) Date of Patent: *Jun. 20, 2017

(54) PROCESSING COLUMNS IN A DATABASE ACCELERATOR WHILE PRESERVING ROW-BASED ARCHITECTURE

(71) Applicant: International Business Machines Corporation, Armonk, NY (US)

(72) Inventors: Jason A. Viehland, Framingham, MA (US); John S. Yates, Jr., Concord, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/706,187

(22) Filed: May 7, 2015

(65) Prior Publication Data
US 2015/0234871 A1 Aug. 20, 2015

Related U.S. Application Data

(63) Continuation of application No. 13/529,367, filed on Jun. 21, 2012, now Pat. No. 9,087,095.

(51) Int. Cl.
*G06F 7/00* (2006.01)
*G06F 17/00* (2006.01)
*G06F 17/30* (2006.01)

(52) U.S. Cl.
CPC .. *G06F 17/30315* (2013.01); *G06F 17/30318* (2013.01)

(58) Field of Classification Search
CPC ......... G06F 17/30312; G06F 17/30519; G06F 17/30424
See application file for complete search history.

(56) References Cited

U.S. PATENT DOCUMENTS

| | | |
|---|---|---|
| 5,692,168 A | 11/1997 | McMahan |
| 5,835,967 A | 11/1998 | McMahan |
| 6,718,290 B1 | 4/2004 | Szymczak et al. |
| 7,228,323 B2 | 6/2007 | Angerer et al. |
| 7,287,173 B2 | 10/2007 | Hsieh |
| 7,698,338 B2 | 4/2010 | Hinshaw et al. |
| 7,730,077 B2 | 6/2010 | Hinshaw et al. |

(Continued)

OTHER PUBLICATIONS

Vaidya, Pranav et al., A Novel Multicontext Coarse-Grained Join Accelerator for Column-Oriented Databases, ACM Transactions on Reconfigurable Technology and Systems, May 2011, vol. 4, Issue 2, Article No. 13, ACM, New York, New York, United States.

*Primary Examiner* — Susan Chen
(74) *Attorney, Agent, or Firm* — Patterson + Sheridan, LLP

(57) ABSTRACT

Database processing using columns to present to a processing unit decompressed column data without changing the underlying row-based database architecture. For some embodiments, a database accelerator is used to efficiently process the columns of a database and output tuples to a processing unit's memory, such that the columns can be quickly processed (with the advantages of a column-based architecture) to create tuples of requested data, but without having to depart from a row-based architecture at the processing unit level or having decompressed data scattered throughout the processing unit's memory.

7 Claims, 4 Drawing Sheets

(56) References Cited

U.S. PATENT DOCUMENTS

| | | | |
|---|---|---|---|
| 7,908,259 B2* | 3/2011 | Branscome | ....... G06F 17/30442 |
| | | | 707/705 |
| 8,242,718 B2 | 8/2012 | Van Endert | |
| 8,326,819 B2 | 12/2012 | Indeck et al. | |
| 8,495,455 B1 | 7/2013 | Zhang et al. | |
| 9,087,095 B2* | 7/2015 | Viehland | ........... G06F 17/30312 |
| 2008/0189251 A1 | 8/2008 | Branscome et al. | |
| 2008/0222136 A1* | 9/2008 | Yates | ................ G06F 17/30321 |
| 2010/0223392 A1* | 9/2010 | Pond | ................ H04N 21/23424 |
| | | | 709/231 |
| 2010/0241828 A1* | 9/2010 | Yu | ........................... G06F 8/456 |
| | | | 712/30 |
| 2011/0218987 A1 | 9/2011 | Branscome et al. | |
| 2012/0047126 A1 | 2/2012 | Branscome et al. | |
| 2013/0346428 A1 | 12/2013 | Viehland et al. | |
| 2014/0095468 A1* | 4/2014 | Aingaran | .......... G06F 17/30501 |
| | | | 707/713 |

* cited by examiner

| Colums | Banks | Slice Buffer Payload (bytes) | Slice Buffer Cycles |
|---|---|---|---|
| 1 | 1 | 1024 | 128 (320ns) |
| 2 | 2 | 1024 | 128 |
| 3-4 | 4 | 1024 | 128 |
| 5-8 | 8 | 1024 | 128 |
| 9-16 | 16 | 1024 | 128 |
| 17-32 | 32 | 512 | 64 |
| 33-64 | 64 | 256 | 32 |
| 65-128 | 128 | 128 | 16 |
| 129-256 | 256 | 64 | 8 |
| 257-512 | 512 | 32 | 4 | ial
PROCESSING COLUMNS IN A DATABASE ACCELERATOR WHILE PRESERVING ROW-BASED ARCHITECTURE

CROSS-REFERENCE TO RELATED APPLICATION

This application is a continuation of co-pending U.S. patent application Ser. No. 13/529,367, filed Jun. 21, 2012. The aforementioned related patent application is herein incorporated by reference in its entirety.

BACKGROUND

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real time.

SUMMARY

Embodiments disclosed herein provide methods, systems, and computer program products relating to database processing.

One embodiment generally includes storing, in a first memory associated with a first processing unit, data associated with a table having a plurality of columns, wherein the data is stored in the first memory as the plurality of columns; reading at least a portion of each of the stored plurality of columns with the first processing unit; forming one or more tuples of the table from the at least the portion of each of the columns using the first processing unit; and outputting, to a second memory associated with a second processing unit, the tuples for processing by the second processing unit.

Another embodiment generally includes a first processing unit; a first memory associated with the first processing unit, a second processing unit, and a second memory associated with the second processing unit. The first memory is typically configured to store data associated with a table having a plurality of columns, wherein the data is stored in the first memory as the plurality of columns. The first processing unit is typically configured to read at least a portion of each of the stored plurality of columns; form one or more tuples of the table from the at least the portion of each of the columns; and output, to the second memory, the tuples for processing by the second processing unit.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
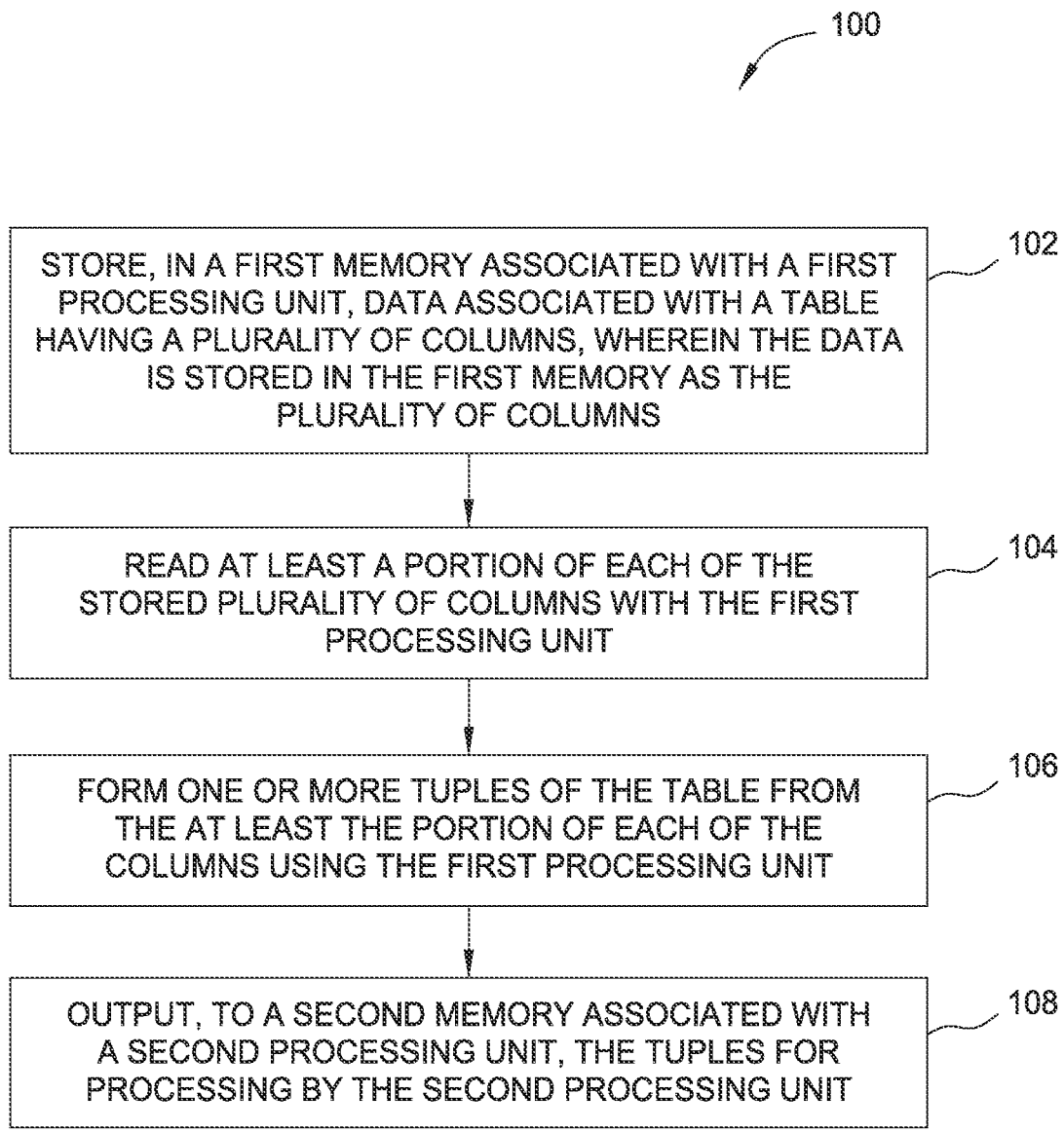
FIG. 1 is a flow diagram of example operations for column-based database processing of a table of data, in accordance with an embodiment of the present disclosure.

Embodiments of the present disclosure generally relate to database applications and, more specifically, to database processing using columns without changing the underlying row-based database architecture. More particularly, database processing uses columns to present to a processing unit decompressed column data without changing the underlying row-based database architecture. For some embodiments, a database accelerator is used to efficiently process the columns of a database and output tuples to a processing unit's memory, such that the columns can be quickly processed (with the advantages of a column-based architecture) to create tuples of requested data, but without having to depart from a row-based architecture at the processing unit level or having decompressed data scattered throughout the processing unit's memory.

In the following, reference is made to various embodiments of the disclosure. This disclosure may, however, be embodied in many different forms and should not be construed as limited to any specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

Example Database Management System Processes in a Column-Based Database

A database is an organized collection of data for one or more purposes, usually in digital form. To utilize the data, a database management system (DBMS) may traverse the organized collection of data through database processing using well-known programming languages such as SQL. Typical database processing of a DBMS employs row-based processing, where data is stored and processed as a plurality of rows (e.g., as a plurality of database records). However, one of the main concerns with row-based databases is that they are designed with the system reading data from every column (e.g., every database field) when only a few columns in the table may be relevant to the query. Database processing using columns is one of the key elements in making databases run faster.

Although one of the expenses of column databases is the joining of various columns together to create tuples of data requested by the user, columns are advantageous because they can be densely compressed since values in a given field are often related to one another. Compressing the data saves disk space and allows the records to be fetched faster. However, after decompression, these records may be scattered throughout the memory (e.g., the memory associated with a central processing unit (CPU)). Therefore, in heavy usage, the memory bandwidth and/or CPU cycles implicated to relate the various columns of data for the user becomes the limiting resource. A database accelerator—which may be realized by another processing unit, such as a field programmable gate array (FPGA), application specific integrated circuit (ASIC), programmable logic device (PLD), etc.— may eliminate this by presenting the tuple data in a predetermined form for further processing, which may include any of various suitable database operations, such as joins, user output, computation, and the like.

With this solution, data for multiple columns from a table may be stored in a memory associated with the database accelerator. The database accelerator may contain a memory controller capable of reading incremental pieces of each column from this memory, decompressing the fields, and knitting the column values together into tuples. The database accelerator may then evaluate each tuple in its entirety prior to being written to CPU memory. Thus, column data is efficiently stored, decompressed, evaluated, and presented to the user without changing the underlying row-based database architecture.

FIG. 1 is a flow diagram of example operations 100 for column-based database processing, according to an embodiment of the present disclosure. The operations 100 may be (at least partially) performed by a first processing unit, which may be referred to as a database accelerator and may be implemented in an FPGA, for example.

The operations 100 may begin, at 102, by storing, in a first memory associated with a first processing unit, data associated with a table having a plurality of columns. The data is stored in the first memory as the plurality of columns. Typically, the table also has a plurality of rows. The first memory may be a memory local to the database accelerator (e.g., the FPGA).

At 104, the first processing unit may (concurrently) read at least a portion of each of the stored plurality of columns. In other words, a portion of each of the columns may be streamed into the first processing unit and operated on concurrently. The at least the portion of each of the stored plurality of columns may be deemed as a "working stream." The size of the working stream from each column may be based on the working memory size. For some embodiments, each of the working streams may be retrieved as a group of column entries, processed as a group, and/or stored as a group.

The first processing unit may form one or more tuples of the table from the at least the portion of each of the columns at 106. For some embodiments, the first processing unit may decompress the at least the portion of each of the columns before forming the one or more tuples at 106. At 108, the first processing unit may output, to a second memory associated with a second processing unit, the tuples for processing by the second processing unit. The second processing unit may comprise a CPU, for example. The first processing unit may output the assembled tuples in a streaming fashion. Each tuple may be a complete, valid record, rather than just a single field of a record.

For some embodiments, the tuples formed at 106 may be processed against a predicate. Then, at 108, the first processing unit may output, to the second memory associated with the second processing unit, the tuples that survived the predicate analysis.

In operation, the first processing unit may bring in multiple working streams of the plurality of columns, process the multiple working streams in parallel, and generate from this processing a single stream of (row-based) tuples. With this approach, a plurality of fields may be processed in a highly parallel, streaming manner in hardware that preserves the row-based processing within the already existing software. This provides a very efficient mechanism for processing database fields.

Figure 2:
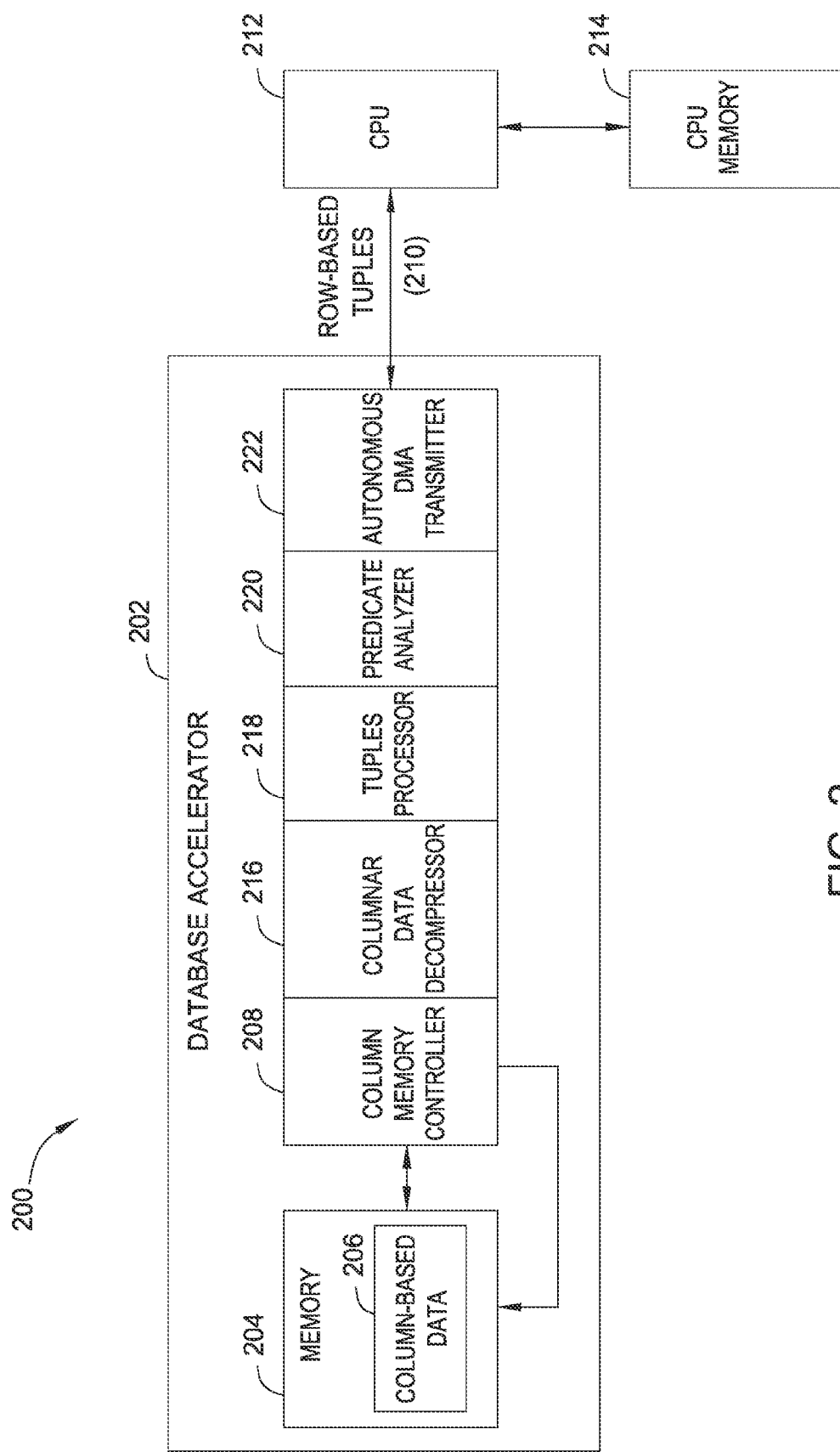
FIG. 2 illustrates an example architecture for column-based database processing, in accordance with an embodiment of the present disclosure.

FIG. 2 is an example architecture 200 for column-based database processing, in accordance with an embodiment of the present disclosure. A database accelerator 202 may perform the column-based database processing. A memory 204 associated with the database accelerator 202 may store column-based data 206. The memory 204 may be external to or embedded in the database accelerator 202, as shown. The database accelerator 202 may include a column memory controller 208, which may be configured to read incremental pieces of each column (i.e., the working streams). The column memory controller 208 may further comprise a columnar data decompressor 216 configured to decompress the data in the columns and a tuples knitting processor 218 adapted to assemble tuples from the decompressed data. For some embodiments, the decompressor 216 and/or the tuples processor 218 may be implemented as separate modules in the database accelerator 202, distinct from the column memory controller 208, as illustrated in FIG. 2. The database accelerator 202 may also be configured to analyze predicates through a predicate analyzer 220, as well as transfer autonomous direct memory addresses (DMA) back to the host through a autonomous DMA transmitter 222. The column memory controller 208 may output the row-based tuples 210 to a CPU 212, which may have the tuples stored in a CPU memory 214, perhaps after additional processing. For some embodiments, the tuples may be stored directly in the CPU memory 214.

Example Column Buffer FIFO Bank Shifter and Memory Interface

As described above, column-based database processing may involve decompressing the data within incremental pieces of a column. Maintaining a data stream out of a decompression module (i.e., a decompressor) may be accomplished using a column buffer first-in-first-out (FIFO) bank. The column buffer FIFO bank may read from the page buffer and shift out payload instructions for each column in the schema to the Reduced Table Architecture (RTA) packet processor. The goal of the column buffer may be to always supply an ample amount of buffered data for the decompression module to materialize a column value without unnecessarily stalling, though this may not always be possible. This module may produce one field per cycle. These modules may be ganged together in parallel with each producing a field per cycle for added acceleration.

A simple finite state machine (FSM) may be utilized to control the decompression module. The FSM may use a column count from the schema and a row count from the header to drive some of the basic counters for the decompression process. The column number is particularly important as it may be used to drive reading and writing of all state random access memories (RAMs) for the decompression.

Figures 3, 4:
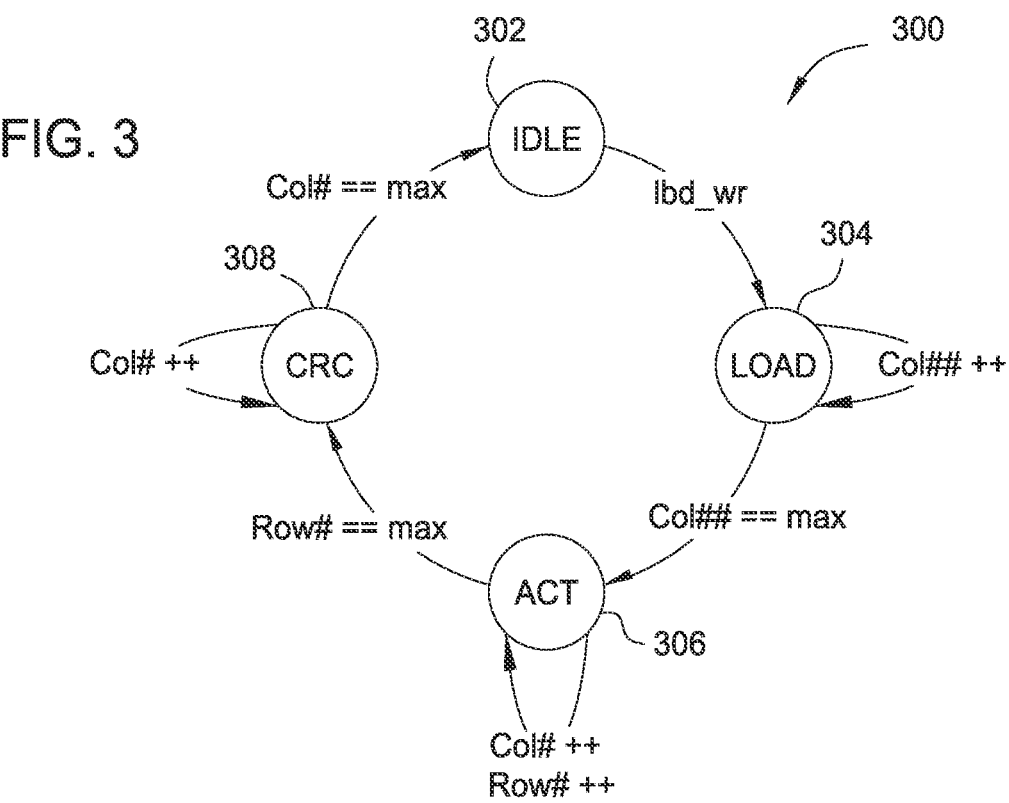
FIG. 3 illustrates an example diagram of a finite state machine (FSM) for column-based database processing, in accordance with an embodiment of the present disclosure.
FIG. 4 illustrates a table for determining certain parameters for column-based database processing, in accordance with an embodiment of the present disclosure.

FIG. 3 illustrates an example FSM 300 for controlling a decompression module, according to an embodiment of the present disclosure. Initially in IDLE state 302, the FSM may transition into the LOAD state 304 when an Input Buffer Descriptor (IBD) is written into the module. When this happens, the column count may already be known from the schema, and the data addresses of each Column Slice in the Slice Buffer may be specified by the IBD. The IBD may be written into the Slice Memory Pointer Bank, for example, as one value for each column. This value may only contain the starting address as written into the Slice Buffer. As data is read out of the Slice Buffer in the ACT state 306, the pointer value may be incremented and written back into memory. The Slice Memory Pointer Bank may consist of a dual-ported RAM allowing one port to be read while the incremented result is written back into the memory. For scans with fewer columns than pipeline stages, a special case may be supplied to provide the expected performance. At the Cyclic Redundancy Check (CRC) state 308, the FPGA may detect accidental changes to raw data where corrective action may be taken against presumed data corruption.

To allow as much data in the buffer as possible, the size of each column's buffer may be determined by the number of columns in the present schema, indicated by a TableDescriptorLastEntry register value. For example, if the TableDescriptorLastEntry value is 45 (0x2D in hexadecimal), then the number of banks buffered would be 0x40, which is the next highest bit above the count. This may allow for easy translation of addressing into the FIFO, though a stack of 8 counters (one for each block RAM) may still be maintained. As another example, if 32B is read from the Slice Buffer for 512 columns, the read for each column is 128B for 64 columns, though in this example, the logic will set the Slice Buffer read size to 128B even though there are only 45 columns.

FIG. 4 is a table 400 for determining certain parameters for column-based database processing, in accordance with an embodiment of the present disclosure. Column 402 in table 400 represents the number of columns queried in the database processing. Column 404 represents the number of memory banks (i.e., the incremental pieces) to be used for efficient column-based database processing. Column 406 represents the size of the Slice Buffer Payload, in bytes, for efficient column-based database processing. Column 408 represents the number of Slice Buffer Cycles that may run for successful column-based database processing. The reasoning behind the construction of table 400 is to observe that if there are fewer columns, the schema may be commutated through fewer cycles. Conversely, if there are many columns, there may need to be many cycles before the FIFO pointers need to be checked. It should be noted that if the type happens to be a Variable-length Character datatype (VC). the commutation on the respective column may be stalled in order to continue reading and shifting the data. However, VCs are typically located at the end of the Table Descriptor so that they may be considered a special case, using the remaining unused blocks.

The commutation FSM may be integrated with a column data shifter to drive most of the work. The goal may be to change columns with every cycle. Before incrementing to the next column, the FSM may compute whether or not to advance based on the read and write pointer values. For example, if the pointer values are two or more cycles apart and the read is only a single cycle apart, the FSM may increment to the next column on the next read.

Figure 5:
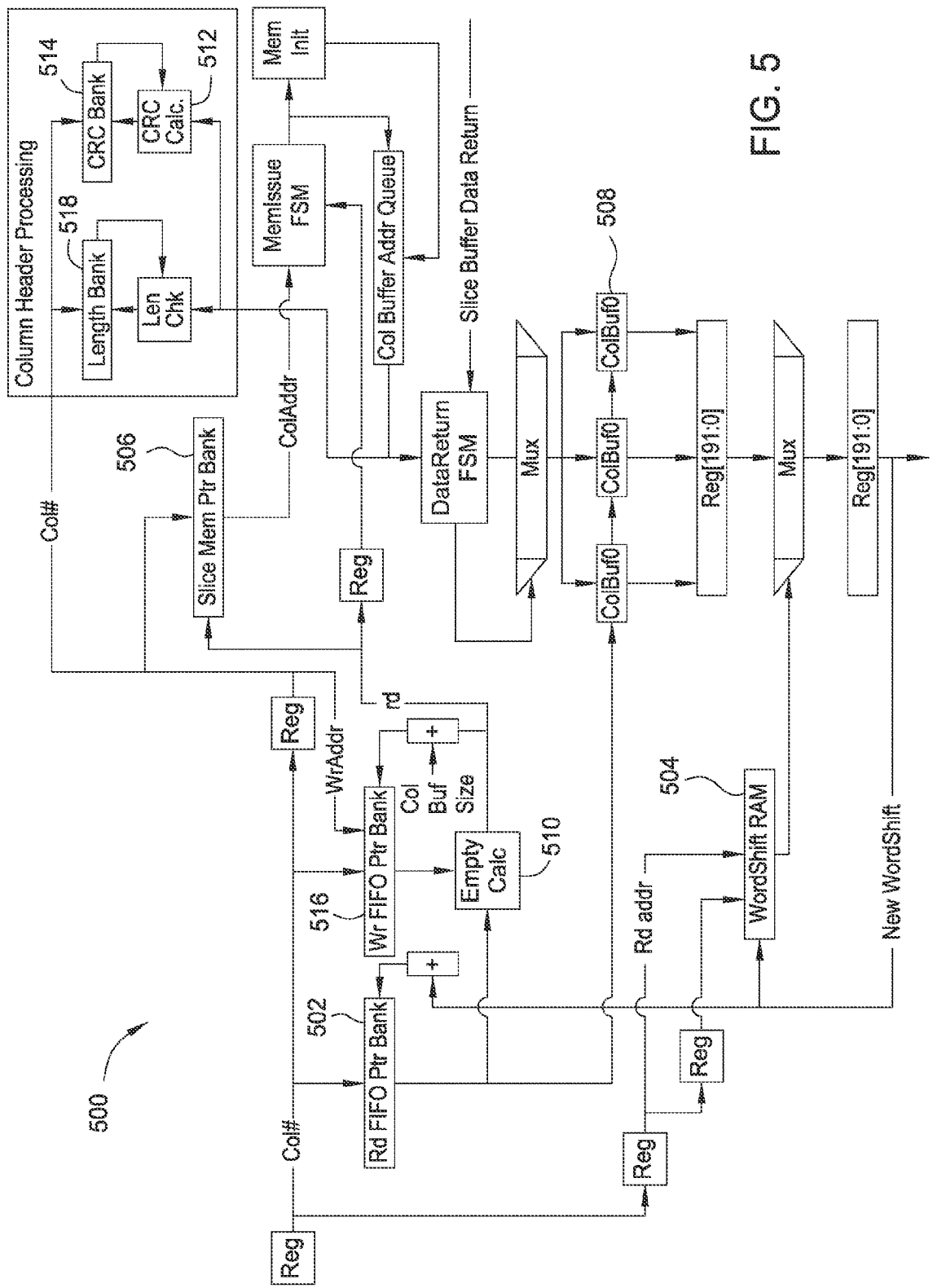
FIG. 5 illustrates an example block diagram of a shifter for column-based database processing, in accordance with an embodiment of the present disclosure.

FIG. 5 illustrates an example block diagram of a shifter 500 (e.g., a column data shifter) for column-based database processing, according to an aspect of the present disclosure. In one embodiment, the shifter 500 may contain 16 kB of Block RAM (BRAM) in 64-bit wide true-dual-port organization serving as the column buffer 508 and four 4 kB BRAMs, 502 and 516, to store the input and output counters. The four BRAMS may store 512 columns and may contain a cache-line burst of 32 double writes (DW). Each BRAM may contain an input and output counter, which may be serviced in round-robin fashion per the table descriptor. In an extreme case of a scan of only one, two, or three columns, the counters may be read every cycle, every other cycle, or every third cycle, respectively. For tables consisting of more than four columns, each counter may be read every fourth cycle. Essentially, the four BRAMS may be considered as an asynchronous FIFO running at 400 MHz, receiving data from a Wishbone bus connected to the page buffer memory controller in the 250 MHz clock domain. Reads may be synchronous with the decompressor at 400 MHz.

For some embodiments, the shifter 500 may read 64 bits at a time from the bitstream. A fifth BRAM (e.g., Wordshift RAM 504) may be configured to store the shift offset and remainder result for each column. The shifter 500 may ideally work off of at least a 128-bit string to assemble a valid packet. For the shifter 500 to achieve the goal of assembling one packet per column per cycle, any remaining wordshift value and the respective offsets may be saved in the Wordshift RAM 504 as the commutator moves through the columns.

The Slice Memory Pointer Bank 506 may be another RAM utilized by the memory interface for some embodiments. It may be loaded with the initial addresses and offsets into the Slice Buffer as specified by the DMA Buffer Descriptors. It may have 512, 32-bit addresses, one for each of the columns in the filter. As the commutator moves through each column in the table descriptor, the table descriptor count may read the value out on the previous cycle, use this value to read the desired number of 32-byte burst lines from the memory, add the burst lines to the address (e.g., as the address is transferred to a write register), and write the value back into that column location. If the TableDescriptorLastEntry value is equal to 1, then the RAM may be bypassed, and only the counters may be used.

In one example walk-through of the shifter operations, the shifter 500 may begin when SETUP has been loaded. A first Row Load Flag may instruct all FIFO pointers 502, 516 to reset by emptying their contents regardless of their value stored in the Read and Write FIFO Pointer Banks. At this point, the following may be known: (1) the number of columns in the scan and the size and types of those columns, (2) the Column Buffer Bank sizes and the size of the FIFO Pointer Bank full/empty flags, and (3) the memory request sizes for each column. Next, the buffer descriptor, forwarded from the Direct Memory Address (DMA) Source module, may be loaded into the Slice Memory Pointer Bank 506. The FSM may then transition to the LOAD state 304 and begin incrementing the column number for the first row. Because the First Row Load Flag is set, the Read FIFO Pointer Bank 502 values and the Write FIFO Pointer Bank 516 values may be zeroed.

Next, all columns may pass the Empty Calculation module 510, thereby initiating a read from the Slice Buffer via the Slice Memory Pointer Bank 506 for each column number. The data may then be returned, and the first word may be checked for a certain value (i.e., the "magic number."). Then, the second word may be loaded into the Length Bank 518, and data may be loaded into the Column Buffer RAMs 508. Next, the CRC for the column may be calculated and stored in the CRC Bank 514. Each DW of the column payload may be used to calculate the CRC except for the CRC DW itself. The CRC DW is the last full DW of the page. Next, the Write FIFO Pointer Bank 516 values are updated. After the first row is loaded, the FSM may transition into the ACT state 306, and filtering may begin. Here, the column number may continue to increment while checking the FIFO read and write pointers 502, 516 for empty values via the Empty Calculation module 510. Finally, "o_width_enable," a variable utilized in one example embodiment, may be set, which may then start the schema read and transfer of the RAMs into "rta_packet."

Example Filter Interface

For some embodiments, the module name of the Filter Interface may be named "filter_if." This module may control filter resets, interrupts, context switching, and final register readback decoding. A tracking FSM may transition through its states based on decodes of the Wishbone bus addresses and some filter control signals. These transitions may set the resets for the filter and ensure that the filter is in the correct state for each new scan.

According to certain embodiments, a single-column scan may take approximately as many cycles as fields. For example, a select count(*) may only evaluate the created and deleted transaction IDs to establish how many valid fields are in the record, returning only the row ID ("row_ID"). This may entail 2 cycles per field, which calculates to 40 μs for 5000 records per scan. While this test is not a valid test of performance, it does show that the filter interface can clock through its states considerably faster than a row-based design.

Each filter may maintain 32 SETUP buffer locations at 8 kB offsets in the Slice Buffer, which may have a size of 256 kB, for a total of 2 MB per chip. As the SETUP is read into the system, it may also be buffered in the Slice Buffer to one of these locations. Due to the faster turn-around for scans, the filter interface module may maintain a list of valid context pointers in a small 32-deep look-up table (LUT) memory.

These context pointers may be loaded by saving SETUP locations to a small FIFO. With each new SETUP loaded, the buffer count may increment until 32 where it rolls over, overwriting the $0^{th}$ location. Scans resulting in scan continuation may write the buffer number and the last row value into the FIFO.

If a scan ends without scan-continuation, there are no new pending buffer descriptors, and the FIFO is not empty, the FSM may read the buffer for the next entry, load the buffered SETUP from the Slice Buffer, and run the scan using the last row value from the FIFO.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of database processing, comprising:
storing, in a first memory associated with a first processing unit, data associated with a table having a plurality of columns, wherein the data is stored in the first memory as the plurality of columns;
reading at least a portion of each of the stored plurality of columns with the first processing unit;
decompressing, in parallel, the read portions of the columns, wherein the first processing unit comprises a column buffer first-in-first-out (FIFO) configured to supply the read portions of the columns for the decompression and wherein the first processing unit is configured to decompress the read portions of the columns according to a finite state machine (FSM) based at least in part on a column number for each of the read portions of the columns;
forming one or more tuples of the table from at least the decompressed read portions of each of the columns using the first processing unit; and
outputting, to a second memory associated with a second processing unit, the tuples for processing by the second processing unit.

2. The method of claim 1, wherein the first processing unit comprises a database accelerator.

3. The method of claim 2, wherein the database accelerator comprises a field programmable gate array (FPGA).

4. The method of claim 1, wherein the second processing unit comprises a central processing unit (CPU).

5. The method of claim 1, wherein the table comprises a database and wherein the one or more tuples comprise one or more records of the database.

6. The method of claim 1, wherein the reading comprises concurrently reading the at least the portion of each of the stored plurality of columns with the first processing unit.

7. The method of claim 1, further comprising decompressing the at least the portion of each of the columns before forming the one or more tuples.

* * * * *